(12) United States Patent
Kim et al.

(10) Patent No.: US 12,307,153 B2
(45) Date of Patent: May 20, 2025

(54) MULTI-DISPLAY DEVICE AND DATA TRANSMISSION METHOD THEREOF

(71) Applicant: SAMSUNG ELECTRONICS CO., LTD., Suwon-si (KR)

(72) Inventors: Sejun Kim, Suwon-si (KR); Kibo Kim, Suwon-si (KR); Jinsub Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/405,502

(22) Filed: Jan. 5, 2024

(65) Prior Publication Data
US 2024/0152308 A1 May 9, 2024

Related U.S. Application Data

(63) Continuation of application No. PCT/KR2022/009138, filed on Jun. 27, 2022.

(30) Foreign Application Priority Data

Sep. 1, 2021 (KR) .................. 10-2021-0116098

(51) Int. Cl.
G06F 3/14 (2006.01)
(52) U.S. Cl.
CPC ................. G06F 3/1446 (2013.01)
(58) Field of Classification Search
CPC .................................... G06F 3/1446
See application file for complete search history.

(56) References Cited

U.S. PATENT DOCUMENTS

| 6,999,045 B2 | 2/2006 | Cok |
| 7,777,691 B1 * | 8/2010 | Nimmer ............... G06F 3/1446 |
| | | 345/1.3 |

(Continued)

FOREIGN PATENT DOCUMENTS

| JP | 2002-311881 A | 10/2002 |
| JP | 2004-46186 A | 2/2004 |

(Continued)

OTHER PUBLICATIONS

International Search Report (PCT/ISA/210) issued on Sep. 29, 2022 by the International Searching Authority in International Patent Application No. PCT/KR2022/009138.

(Continued)

*Primary Examiner* — Doon Y Chow
(74) *Attorney, Agent, or Firm* — Sughrue Mion, PLLC (57) ABSTRACT

A multi-display device includes a plurality of display modules. At least one display module of the plurality of display modules includes: a receiver to receive first video data and first control data from another display module connected to a front stage, from among the plurality of display modules, or an external input device; one or more processors to obtain, from the first video data, a first area corresponding to video data that the at least one display module displays; and a merger to: allocate, to the first area, second control data including remaining control data of the first control data other than control data of the first control data to control the at least one display module, and merge the second control data with second video data including remaining video data of the first video data other than video data of the first video data that the at least one display module displays.

14 Claims, 7 Drawing Sheets

(56) References Cited

U.S. PATENT DOCUMENTS

| | | | |
|---|---|---|---|
| 7,792,412 B2 | 9/2010 | Nishitani | |
| 8,836,713 B2 | 9/2014 | Caskey et al. | |
| 9,436,685 B2 * | 9/2016 | Roth | G06F 3/04883 |
| 10,225,528 B2 | 3/2019 | Cho et al. | |
| 11,036,455 B2 * | 6/2021 | Kim | G09G 3/32 |
| 11,282,445 B2 * | 3/2022 | Yeo | G06F 3/1446 |
| 11,537,348 B2 | 12/2022 | Kim et al. | |
| 11,645,030 B2 * | 5/2023 | Schmid | G06F 3/1423 |
| | | | 709/246 |
| 12,125,429 B2 * | 10/2024 | Kim | G09G 3/3216 |
| 2003/0189581 A1 | 10/2003 | Nasoff et al. | |
| 2007/0052857 A1 | 3/2007 | Song et al. | |
| 2011/0216082 A1 * | 9/2011 | Caskey | G06F 3/1446 |
| | | | 345/560 |
| 2021/0233464 A1 * | 7/2021 | Yeo | G06F 3/1446 |

FOREIGN PATENT DOCUMENTS

| | | |
|---|---|---|
| JP | 4586389 B2 | 11/2010 |
| JP | 4731827 B2 | 7/2011 |
| JP | 2012-212061 A | 11/2012 |
| KR | 10-2007-0028839 A | 3/2007 |
| KR | 10-0922116 B1 | 10/2009 |
| KR | 10-2010-0095832 A | 9/2010 |
| KR | 10-1497522 B1 | 3/2015 |
| KR | 10-1548351 B1 | 8/2015 |
| KR | 10-1987186 B1 | 6/2019 |
| KR | 10-2020-0025880 A | 3/2020 |
| KR | 10-2020-0107776 A | 9/2020 |

OTHER PUBLICATIONS

Written Opinion (PCT/ISA/237) issued on Sep. 29, 2022 by the International Searching Authority in International Patent Application No. PCT/KR2022/009138.

* cited by examiner

MULTI-DISPLAY DEVICE AND DATA TRANSMISSION METHOD THEREOF

CROSS-REFERENCE TO RELATED APPLICATIONS

This application is a by-pass continuation application of International Application No. PCT/KR2022/009138, filed on Jun. 27, 2022, which is based on and claims priority to Korean Patent Application No. 10-2021-0116098, filed on Sep. 1, 2021, in the Korean Intellectual Property Office, the disclosures of which are incorporated by reference herein their entireties.

BACKGROUND

1. Field

The disclosure relates to a multi-display device that merges control data into an available area of video data and transmits the same to a display module connected to a rear stage and a method for transmitting data thereby.

2. Description of Related Art

A multi-display device is a large-scale display constituted of a plurality of display modules and may be utilized as, e.g., a large format display (LFD) or digital signage installed primarily in an outdoor space, such as public places, commercial places, or building rooftops. Multi-display devices utilize information and communication technology to output various video and text information, such as advertisements or news, on the display.

As each display module of a multi-display device transmits and receives video data and control data to/from adjacent display modules, each display module may display its own video data and control itself by the control data.

When each display module of a multi-display device merges control data into an available area (or surplus area) used by the display module displaying in video data (received from a display module connected to the front stage or an external input device) and transmits the merged control data to the display module connected to the rear stage, it is possible to optimize and use the bandwidth and to minimize hardware resources (e.g., communication chip) for configuring the transmitter and the receiver of each display module.

SUMMARY

Provided are a multi-display device that merges control data into an available area of video data and transmits the same to a display module connected to a rear stage and a method for transmitting data thereby.

According to an aspect of the disclosure, a multi-display device includes: a plurality of display modules that are sequentially connected, wherein at least one display module of the plurality of display modules comprises: a receiver configured to receive first video data and first control data from another display module connected to a front stage, from among the plurality of display modules, or an external input device; one or more processors configured to obtain, from the first video data, a first available area corresponding to video data that the at least one display module displays; and a merger configured to: allocate, to the first available area, second control data including remaining control data of the first control data other than control data of the first control data to control the at least one display module, and merge the second control data with second video data including remaining video data of the first video data other than video data of the first video data that the at least one display module displays.

In an embodiment, the at least one display module may further include: an interface configured to obtain backward control data transmitted to the external input device from a peripheral device connected to the at least one display module, a formatter configured to: obtain, from the first control data, a second available area corresponding to the control data to control the at least one display module, and format the backward control data in the second available area, and wherein the second control data further includes the backward control data.

In an embodiment, the at least one display module may further include a transmitter configured to transmit the merged second video data and second control data to another display module connected to a rear stage, from among the plurality of display modules.

In an embodiment, the transmitter comprises at least one communication chipset configured to support a predetermined bandwidth, and wherein a number of the at least one communication chipset may be determined based on the predetermined bandwidth and a size of the merged second video data and second control data.

In an embodiment, a first display module of the plurality of display modules may further include a second receiver, and wherein the second receiver is configured to receive, from a rearmost display module of the plurality of display modules, the backward control data obtained by at least one other display module.

In an embodiment, the first display module may further include a second transmitter, and wherein the second transmitter may be configured to transmit the backward control data received by the second receiver to the external input device.

In an embodiment, the backward control data may include control information for controlling the at least one display module or state information about the at least one display module.

According to an aspect of the disclosure, a method for transmitting data in at least one display module of a plurality of sequentially connected display modules included in a multi-display device, the method comprising: receiving first video data and first control data from another display module connected to a front stage, from among the plurality of sequentially connected display modules, or an external input device; obtaining, from the first video data, a first available area corresponding to video data that the at least one display module displays from the first video data; allocating, to the first available area, second control data including remaining control data of the first control data other than control data of the first control data to control the at least one display module; and merging the second control data with second video data including remaining video data of the first video data other than video data of the first video data that the at least one display module displays from the first video data.

In an embodiment, the method may further include: obtaining, from a peripheral device connected to the at least one display module, backward control data transmitted to the external input device from the peripheral device connected to the at least one display module; and obtaining, from the first control data, a second available area corresponding to the control data to control the at least one display module, and formatting the backward control data in the second available area, wherein the second control data further includes the backward control data.

In an embodiment, the method may further include transmitting the merged second video data and second control data to another display module connected to a rear stage, from among the plurality of sequentially connected display modules.

In an embodiment, the transmitting the merged second video data and second control data to the other display module connected to the rear stage may be performed by at least one communication chipset supporting a predetermined bandwidth, and wherein a number of the at least one communication chipset is determined based on the predetermined bandwidth and a size of the merged second video data and second control data.

In an embodiment, the method may further include receiving, from a rearmost display module by a foremost display module, the backward control data obtained by at least one other display module.

In an embodiment, the method may further include transmitting, by the foremost display module, the backward control data received from the rearmost display module to the external input device.

In an embodiment, the backward control data may further include control information for controlling the at least one display module obtained from the peripheral device or state information about the at least one display module.

According to one or more embodiments of the disclosure, each display module in the multi-display device merges control data into an available area in video data used by the each display module. The video data is received from a display module connected to the front stage or an external input device and transmits the merged control data to the display module connected to the rear stage, thereby optimizing and using the bandwidth without waste. Therefore, it is possible to minimize hardware resources (e.g., communication chip) for constituting the transmitter and the receiver of each display module in the multi-display device and to reduce manufacturing costs.

Further, according to one or more embodiments of the disclosure, the display module may format the backward control data obtained from, e.g., a peripheral device into the available area used to control itself in the control data obtained from the display module connected to the front stage, merge the control data with video data and transmit the merged data in the forward direction, thereby eliminating the need for a separate transmitter and a separate receiver in the backward direction to transmit/receive backward control data to thus minimize hardware resources (e.g., communication chip) and reduce manufacturing costs.

Effects of the disclosure are not limited to the foregoing, and other unmentioned effects would be apparent to one of ordinary skill in the art from the following description. In other words, unintended effects in practicing embodiments of the disclosure may also be derived by one of ordinary skill in the art from the embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

In the description of embodiments of the disclosure, common terms widely used as possible have been chosen considering functions in the disclosure, but the terms may be varied depending on the intent of one of ordinary skill in the art or case laws or the advent of new technologies. In certain cases, some terms may be arbitrarily selected by the applicant, and in such case, their detailed definitions may be given in the relevant parts thereof. Accordingly, the terms used herein are determined based on their meanings and the overall disclosure, rather than by the terms themselves.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

When an element "includes" another element, the element may further include the other element, rather excluding the other element, unless particularly stated otherwise. Further, the terms "unit," "module," or "part" as used herein denote a unit processing at least one function or operation, and a unit, module, or part may be implemented in hardware, software, or a combination thereof.

The embodiments may be described and illustrated in terms of blocks, as shown in the drawings, which carry out a described function or functions. These blocks may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by one or more processors (e.g., one or more programmed microprocessors and associated circuitry), or by a combination of dedicated hardware to perform some functions of the block and one or more processors to perform other functions of the block. Each block of the embodiments may be physically separated into two or more interacting and discrete blocks. Likewise, the blocks of the embodiments may be physically combined into more complex blocks.

Embodiments of the disclosure are now described with reference to the accompanying drawings in such a detailed manner as to be easily practiced by one of ordinary skill in the art. However, the disclosure may be implemented in other various forms and is not limited to the embodiments set forth herein. In the drawings, the same reference numerals refer to the same elements, and the size of each component in the drawings may be exaggerated for clarity of description.

Figure 1:
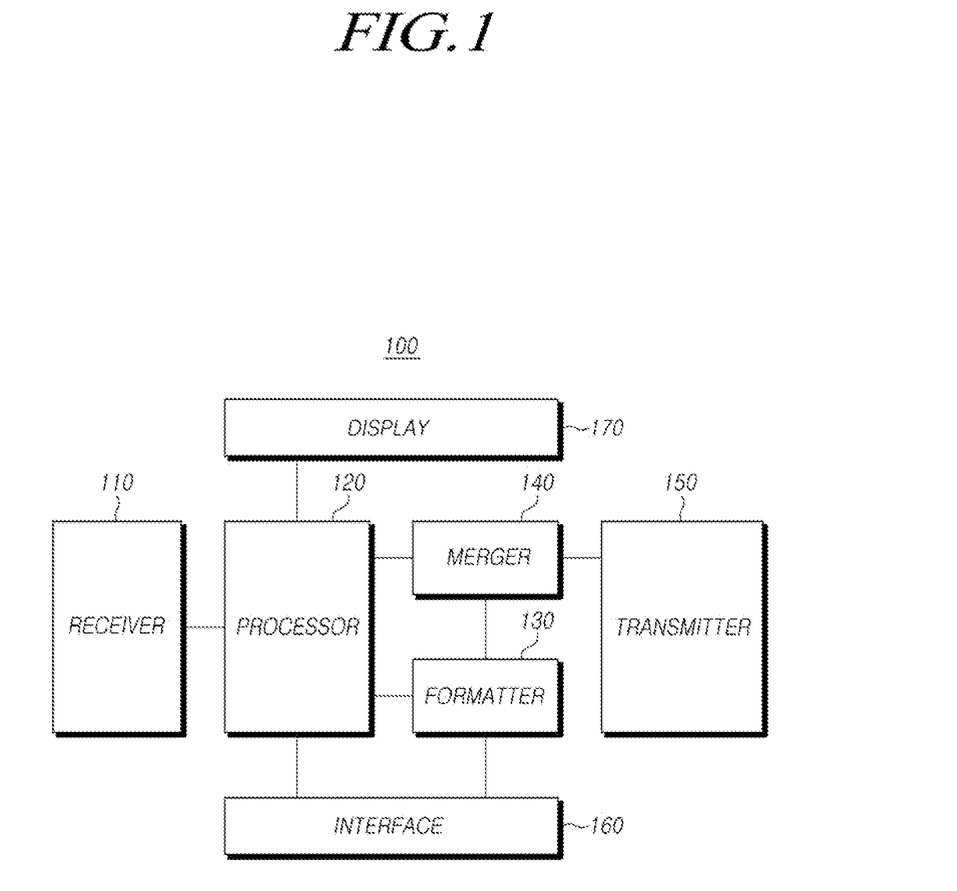
FIG. 1 is a block diagram schematically illustrating a display module of a multi-display device according to an embodiment of the disclosure.

FIG. 1 is a block diagram schematically illustrating a display module of a multi-display device according to an embodiment of the disclosure.

The multi-display device according to an embodiment of the disclosure may include a plurality of display modules 100. The multi-display device may independently display the same image or a different image on each of the display modules 100, or may combine the plurality of display modules 100 to form one screen to together display one image. A multi-display device including a plurality of display modules 100 is described below in detail with reference to FIG. 4.

Referring to FIG. 1, each display module 100 of the multi-display device includes a receiver 110, one or more processors 120, a formatter 130, a merger 140, a transmitter 150, an interface 160, and a display 170. The display module 100 may include additional components in addition to the illustrated components, or may omit at least one of the illustrated components.

According to an embodiment, the receiver 110 may receive video data (or first video data) and control data (or first control data) from a display module connected to a front stage in the multi-display device or an external input device. The receiver 110 may be at least one wired or wireless communication chipset, and each communication chipset may support a predetermined bandwidth. The number of the at least one communication chipset may be determined based on the predetermined bandwidth and the size of entire data including the video data and the control data. The number of communication chipsets according to the present embodiment will be described below with reference to FIGS. 4 and 5. It will be understood by one of ordinary skill in the art that the receiver 110 may receive the video data and the control data using various protocols.

The external input device may refer to a device that provides a video to the multi-display device from the outside, such as a media source device or a media box. The external input device may transmit the video data and the control data to the multi-display device in parallel or in series. For example, the video data may be sequentially transmitted from the external input device to each display module 100 via another display module. For example, the video data provided from the external input device may be received by a first display module, may be received by a second display module via the first display module, and may be received by a third display module via the second display module. Each display module may extract part of the video data provided from the external input device based on its position or the like, and display a video corresponding to the extracted part of the video data.

The control data may include data for the external input device to request predetermined control information from at least one display module 100 or data for the external input device to provide predetermined control data to at least one display module 100. The control data may be sequentially transmitted from the external input device to each display module 100 via another display module. A control data transmission flow of a multi-display device according to an embodiment of the disclosure is described below with reference to FIG. 6.

According to an embodiment, the one or more processors 120 may obtain an area corresponding to video data to be displayed on the display 170 from the video data as a first available area. Since the first available area is a surplus area that is not used in other display modules, it is not necessary to transmit the first available area to other display modules.

According to an embodiment, the display 170 may display video data corresponding to the first available area obtained by the one or more processors 120. The display 170 may include various types of display panels such as a liquid crystal display (LCD) panel, a light emitting diode (LED) panel, an organic light emitting diode (OLED) panel, and a plasma display panel (PDP), and may include panel drivers for driving the display panel.

According to one or more the embodiments, the merger 140 may allocate second control data including remaining control data except for control data used to control the display module from the control data (i.e., the first control data) to the first available area. The merger 140 may merge the second control data with second video data including remaining video data except for video data that the display module displays from the video data (i.e., the first video data). The operation of the merger 140 is described below in detail with reference to FIG. 2.

According to an embodiment, the interface 160 may obtain backward control data transmitted from a peripheral device connected to the display module 100 to the external input device. The peripheral device may include various sensors including a motion sensor, an illuminance sensor, and a temperature/humidity sensor, a camera, various storage devices including memory, and various communication modules including Bluetooth and Wi-Fi. The backward control data may include control information necessary for the external input device to control the display module 100, or may include state information about the display module to be provided to the external input device. Obtaining backward control data and a transmission flow of backward control data according to an embodiment of the disclosure are described below with reference to FIGS. 5 and 6.

According to an embodiment, before merging the second video data and the second control data by the merger 140, the formatter 130 may obtain a second available area corresponding to control data used to control the display module from the first control data, and may format the backward control data in the second available area. Accordingly, the second control data may further include the backward control data. The operation of the formatter 130 is described below in detail with reference to FIG. 2.

According to an embodiment, the transmitter 150 may transmit the merged second video data and second control data to the display module connected to the rear stage. The transmitter 150 may be at least one wired or wireless communication chipset, and each communication chipset may support a predetermined bandwidth. The number of the at least one communication chipset may be determined based on the predetermined bandwidth and a size of entire merged data of the second video data and the second control data. The number of communication chipsets according to the embodiment will be described below with reference to FIG. 4. It will be understood by one of ordinary skill in the art that the transmitter 150 may receive the video data and the control data using various protocols.

According to an embodiment, when the display module 100 is the foremost display module directly connected to the external input device, the display module 100 may further include a second receiver 350 and a second transmitter 360. The second receiver 350 may receive the backward control data obtained by at least one display module from the rearmost display module. The second transmitter 360 may transmit the backward control data received by the second receiver 350 to the external input device. The second receiver 350 and the second transmitter 360 are described below with reference to FIG. 3.

According to the embodiment, each display module 100 in the multi-display device merges control data into an available area used by itself displaying in video data received from a display module connected to the front stage or an external input device and transmits it to the display module connected to the rear stage, thereby optimizing and using the bandwidth without waste. Therefore, it is possible to minimize hardware resources (e.g., communication chip) for constituting the transmitter 150 and the receiver 110 of each display module in the multi-display device and to reduce manufacturing costs.

Further, according to the embodiment, the display module 100 may format the backward control data obtained from, e.g., a peripheral device, through the interface 160, in the available area used to control itself in the control data obtained from the display module connected to the front stage, merge it with video data and transmit it in the forward direction, thereby eliminating the need for a separate transmitter and a separate receiver in the backward direction to transmit/receive backward control data to thus minimize hardware resources (e.g., communication chip) and reduce manufacturing costs.

Figure 2:
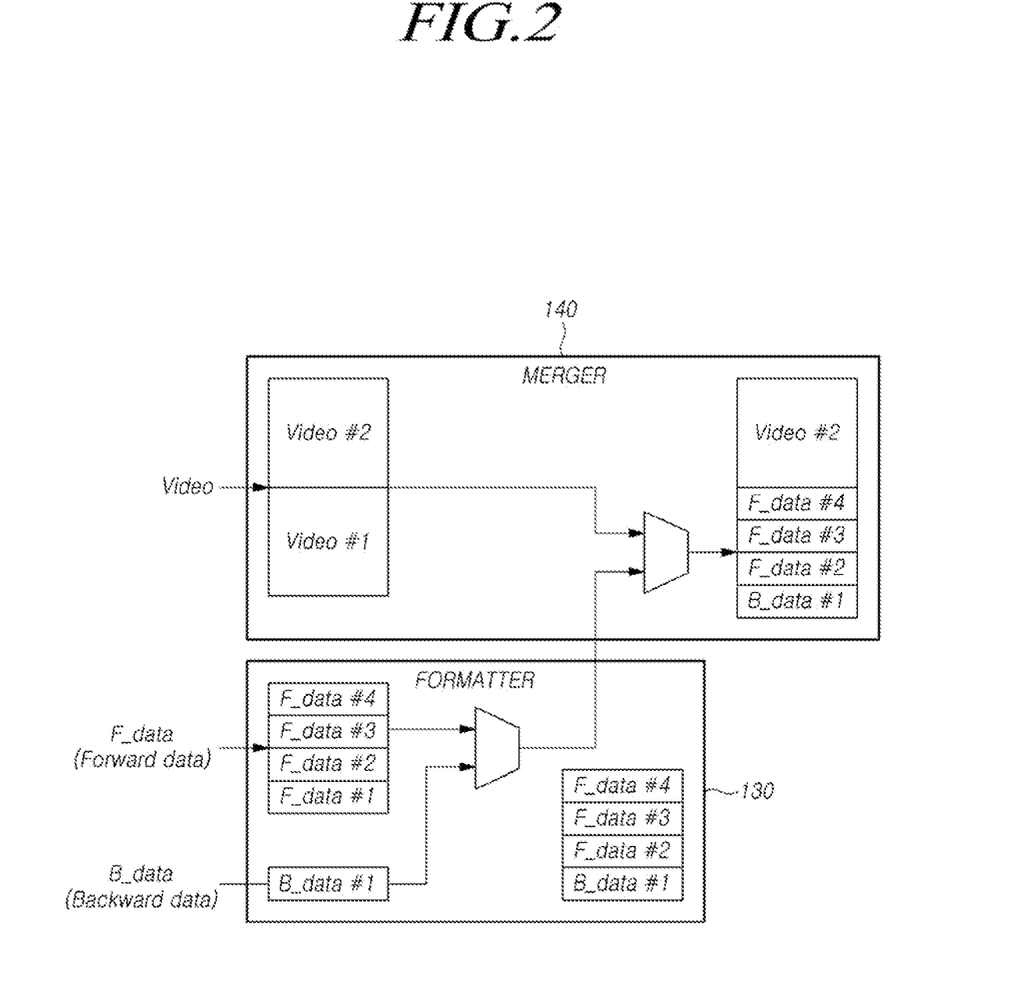
FIG. 2 schematically illustrates operations of a merger and a formatter of a display module according to an embodiment of the disclosure.

FIG. 2 schematically illustrates operations of a merger and a formatter of a display module according to an embodiment of the disclosure.

Referring to FIG. 2, the formatter 130 obtains, from the one or more processors 120, first control data F_data sequentially received in a forward direction from the external input device via other display modules. The first control data received in the forward direction may include data for the external input device to request predetermined control information from at least one display module 100 or data for the external input device to provide predetermined control data to at least one display module 100. The formatter 130 may further obtain backward control data B_data transmitted from the interface 160 to the external input device. The backward control data may include control information necessary for the external input device to control the display module 100 or may include state information about the display module to be provided to the external input device. The formatter 130 may obtain a second available area corresponding to control data used to control the display module from the first control data and format the backward control data in the second available area, generating second control data. Accordingly, the second control data may include the remaining control data except for the control data used to control the display module from the first control data and the backward control data.

In the illustrated example, the formatter 130 of the first display module may obtain first control data (including F_data #1 to F_data #4) provided in the forward direction from the external input device. The formatter 130 may further obtain backward control data including B_data #1 transmitted from the interface 160 to the external input device. The formatter 130 may obtain an area corresponding to F_data #1, which is control data used to control itself, from the first control data as a second available area. The formatter 130 may generate second control data by formatting backward control data including B_data #1 in the second available area.

Referring to FIG. 2, the merger 140 may obtain, from the one or more processors 120, first video data sequentially received from the external input device via other display modules. The example illustrates that some video data, Video #1 and Video #2, are included in the first video data received through a predetermined communication chipset among at least one communication chipset constituting the receiver 110.

Referring to FIG. 2, the merger 140 may obtain an area corresponding to Video #1, which is video data displayed by itself (the display module having the merger 140), from the first video data as a first available area. Since the first available area is a surplus area that is not used in other display modules that are sequentially connected to the display module, it is not necessary to transmit the first available area to the other display modules. The merger 140 may allocate the second control data generated by the formatter 130 to the first available area. The merger 140 may merge the second control data (including, e.g., B_data #1 and F_data #2 to F_data #4) and the second video data including the remaining video data (e.g., Video #2) except for Video #1 which is the video data displayed by itself from the first video data. The second video data and the second control data merged by the merger 140 may be forwardly transmitted to the display module connected to the rear stage by the transmitter 150.

The formatter 130 and the merger 140 according to the embodiment may be hardware components including an application specific integrated circuit (ASIC) and a field programmable gate array (FPGA), software components, and/or combinations of the hardware components and the software components.

Figure 3:
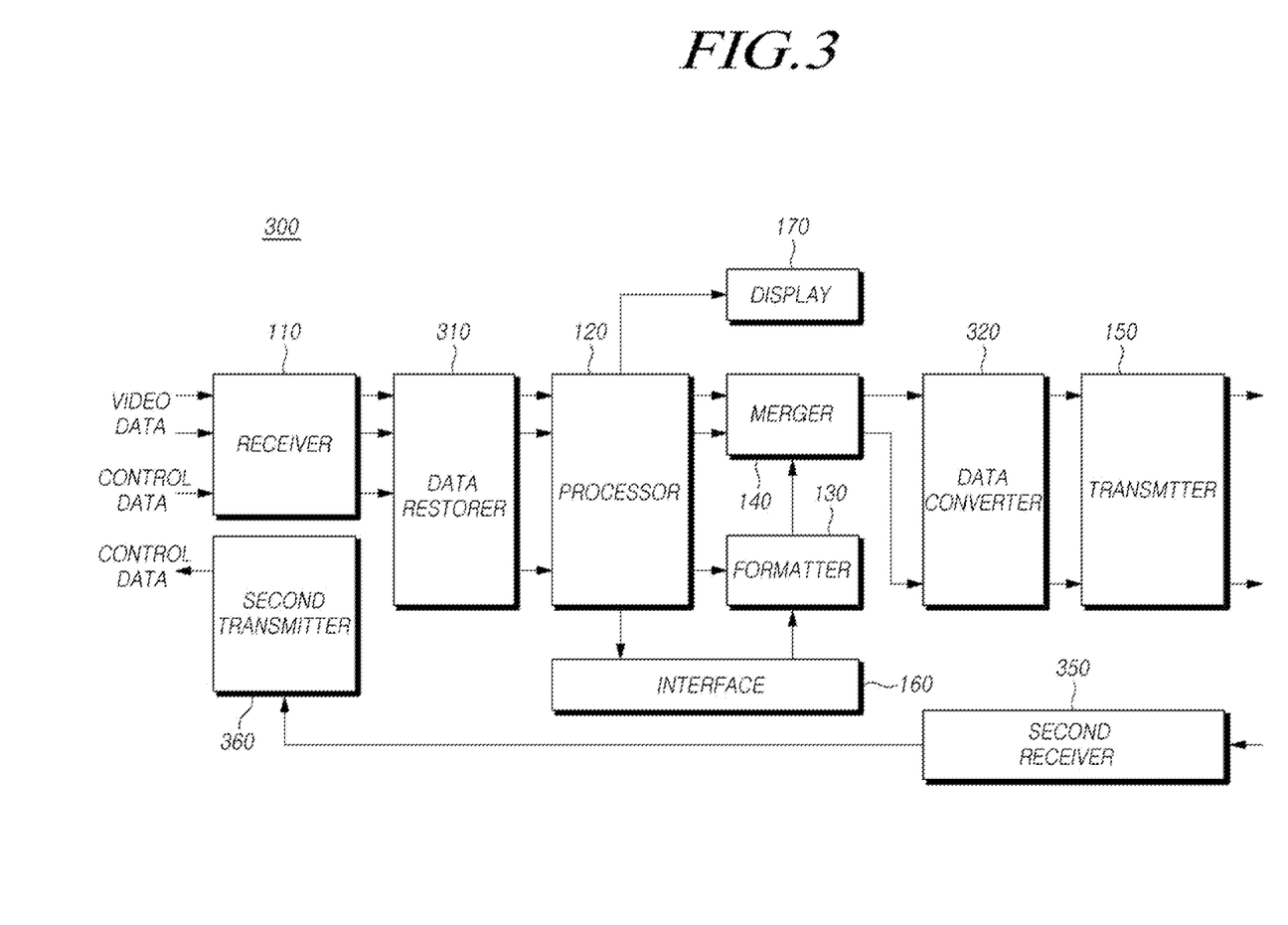
FIG. 3 is a second block diagram schematically illustrating a display module according to an embodiment of the disclosure.

FIG. 3 is a second block diagram schematically illustrating a display module according to an embodiment of the disclosure.

Referring to FIG. 3, the display module 300 may further include a data restorer 310 and a data converter 320, in addition to the receiver 110, the one or more processors 120, the formatter 130, the merger 140, the transmitter 150, the interface 160, and the display 170 described with reference to FIG. 1. The respective operations of the receiver 110, the one or more processors 120, the formatter 130, the merger 140, the transmitter 150, the interface 160, and the display 170 are the same as those described with reference to FIG. 1.

The data restorer 310 may de-serialize the video data and the control data received by the receiver 110. Deserialization refers to an operation of converting the received video data and control data into a data format that may be processed by the one or more processors 120.

The data converter 320 may serialize the data merged by the merger 120 to be transmitted by the transmitter 140.

In case that the display module 300 is the foremost display module directly connected to the external input device, the display module 100 may further include a second receiver 350 and a second transmitter 360.

The second receiver 350 may receive the backward control data obtained by at least one display module from the rearmost display module.

The second transmitter 360 may transmit the backward control data received by the second receiver 350 to the external input device.

Figure 4:
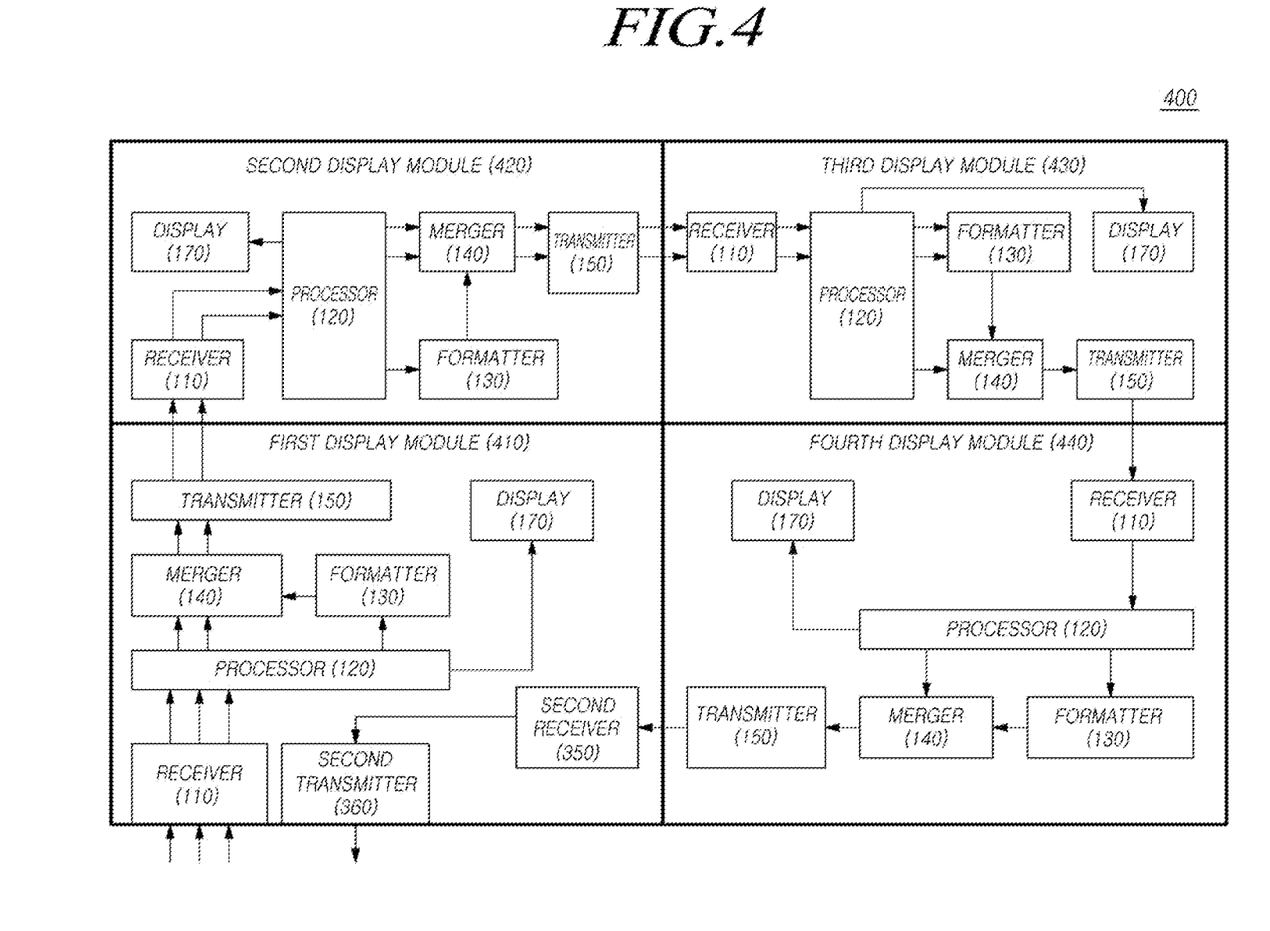
FIG. 4 is a block diagram schematically illustrating a multi-display device including a plurality of display modules according to an embodiment of the disclosure.

FIG. 4 is a block diagram schematically illustrating a multi-display device including a plurality of display modules according to an embodiment of the disclosure.

In the illustrated example, the multi-display device 400 may include four display modules 410, 420, 430, and 440. The four display modules 410, 420, 430, and 440 may be sequentially connected in the order of the first display module 410 connected to the external input device, the second display module 420, the third display module 430, and the fourth display module 440. Each of the four display modules 410, 420, 430, and 440 may include a receiver 110, one or more processors 120, a formatter 130, a merger 140, a transmitter 150, and a display 170. In the illustrated example, the first display module 410, which is the foremost display module directly connected to the external input device, may further include a second receiver 350 and a second transmitter 360. The respective operations of the receiver 110, the one or more processors 120, the formatter 130, the merger 140, the transmitter 150, the display 170, the second receiver 350, and the second transmitter 360 are the same as those described above with reference to FIGS. 1 to 3. Each of the receiver 110 and the transmitter 150 may be at least one communication chipset supporting a predetermined bandwidth. Each communication chipset may support at least one transmission/reception channel. In the illustrated example, the number of arrows connected to the receiver 110 and the transmitter 150 may indicate the number of the at least one communication chipset or the number of transmission/reception channels. The number of the at least one communication chipset or the number of transmission/reception channels may be determined based on the predetermined bandwidth and the size of the entire data including the video data and the control data.

Figure 5:
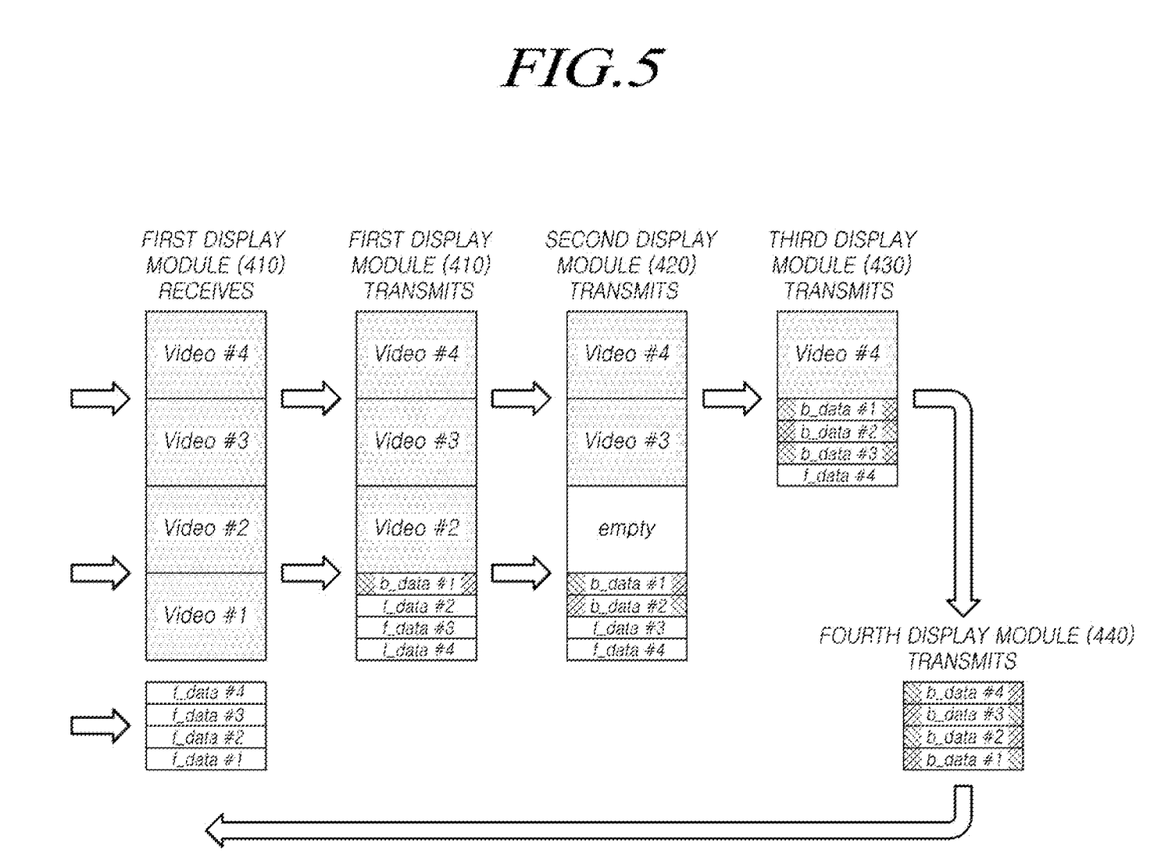
FIG. 5 illustrates a data transmission flow of the multi-display device illustrated in FIG. 4 according to an embodiment of the disclosure.

FIG. 5 illustrates a data transmission flow of the multi-display device illustrated in FIG. 4 according to an embodiment of the disclosure.

The first display module 410 may receive video data (including Video #1 to Video #4) and control data (including f_data #1 to f_data #4) from the external input device. The formatter 130 of the first display module 410 may obtain backward control data b_data #1 transmitted from the interface 160 to the external input device. The formatter 130 may obtain the second available area (f_data #1 area) corresponding to the control data used to control itself from the control data as a surplus area. The formatter 130 may format the backward control data (b_data #1) in the second available area, generating second control data. The second control data may include b_data #1, and f_data #2 to f_data #4. The merger 140 of the first display module 410 may obtain an area corresponding to Video #1, which is video data displayed by itself, from the received video data as a first available area. Since the first available area is a surplus area that is not used in other display modules, it is unnecessary to transmit the first available area to other display modules. The merger 140 may allocate the second control data generated by the formatter 130 to the first available area. The merger 140 may merge the second control data (e.g., b_data #1 and f_data #2 to f_data #4) and the second video data including the remaining video data (e.g., Video #2 to Video #4), except for Video #1 which is the video data displayed by itself from the first video data. The second video data and the second control data merged by the merger 140 may be forwardly transmitted to the second display module 420 connected to the rear stage by the transmitter 150.

Like the first display module 410, the second display module 420 to the fourth display module 440 perform backward control data formatting by the formatter 130, merging video data and control data by the merger 140, and transmitting the merged video data and control data by the transmitter 150.

The transmitter 150 of the fourth display module 440 connected to the rearmost stage transmits control data including the backward control data obtained from at least one display module, which is connected to itself and the front stage, to the second receiver 350 of the first display module 410 connected to the foremost stage. In the illustrated example, the transmitter 150 of the fourth display module 440 may transmit control data including b_data #1 to b_data #4 to the second receiver 350 of the first display module 410. The second transmitter 360 of the first display module 410 may transmit the backward control data received by the second receiver 350 to the external input device.

Referring to the illustrated example, the bandwidth required for transmitting and receiving video data in the first display module 410 to the fourth display module 440 may be the order of the first display module 410> the second display module 420> the third display module 430> the fourth display module 440. Referring to the example illustrated in FIG. 4, the transmitter 150 of the first display module 410, the receiver 110 and transmitter 150 of the second display module 420, and the receiver 110 of the third display module 430 may transmit and receive the merged video data and control data by two communication chipsets supporting a predetermined bandwidth. Further, the transmitter 150 of the third display module 430 and the receiver 110 of the fourth display module 440 may transmit and receive the merged video data and control data by one communication chipset supporting a predetermined bandwidth. Further, the transmitter 150 of the fourth display module 440, the second receiver 350, the second transmitter 360 of the first display module 410 may transmit and receive backward control data by one communication chipset supporting a predetermined bandwidth.

Figure 6:
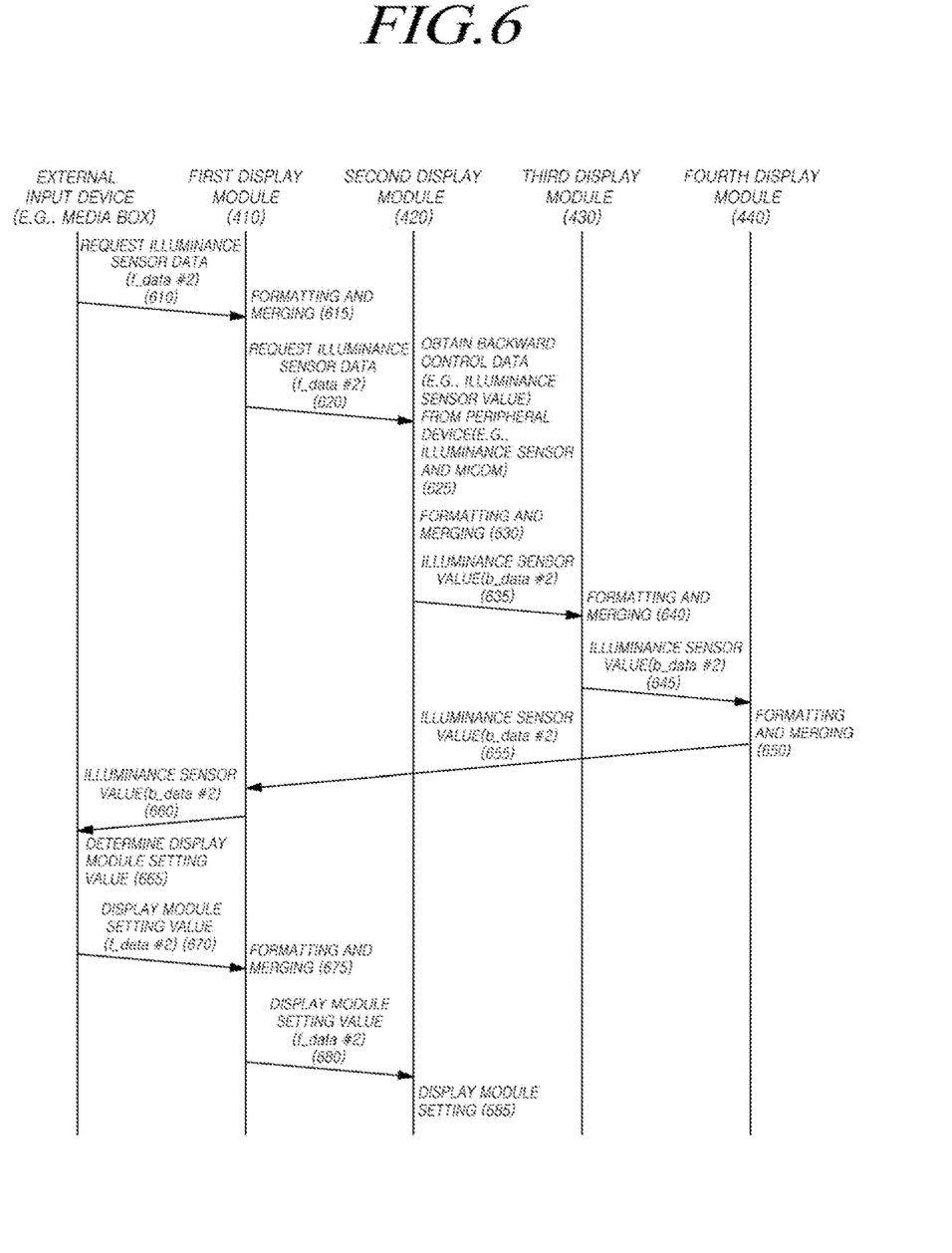
FIG. 6 illustrates a control data transmission flow of the multi-display device illustrated in FIG. 4 according to an embodiment of the disclosure.

FIG. 6 illustrates a control data transmission flow of the multi-display device illustrated in FIG. 4 according to an embodiment of the disclosure.

Referring to FIG. 6, in operation 610 according to an embodiment, the external input device may transmit video data and control data to the first display module 410. In the illustrated example, the control data may include control data f_data #2 for requesting illuminance sensor data from the second display module 420.

In operation 615, as described above, the first display module 410 may perform backward control data formatting by the formatter 130 and video data and control data merging by the merger 140.

In operation 620, the first display module 410 may transmit the merged video data and control data to the second display module 420 by the transmitter 150.

In operation 625, the second display module 420 may obtain backward control data from the peripheral device based on f_data #2, which is control data used to control itself, i.e., control data requesting illuminance sensor data. In the illustrated example, the formatter 130 of the second display module 420 may obtain the backward control data b_data #2 including the illuminance sensor value from the illuminance sensor through the interface 160.

In operation 630, the second display module 420 may perform backward control data formatting by the formatter 130 and video data and control data merging by the merger 140.

In operation 635, the second display module 420 may transmit the merged video data and control data to the third display module 430 by the transmitter 150. The control data transmitted to the third display module 430 may include backward control data b_data #2 including an illuminance sensor value.

In operation 640, the third display module 430 may perform backward control data formatting by the formatter 130 and video data and control data merging by the merger 140.

In operation 645, the third display module 430 may transmit the merged video data and control data to the fourth display module 440 by the transmitter 150.

In operation 650, the fourth display module 440 may perform backward control data formatting by the formatter 130 and video data and control data merging by the merger 140.

In operation 655, the fourth display module 440 connected to the rearmost stage may transmit the merged video data and control data to the first display module 410 connected to the foremost stage by the transmitter 150.

In operation 660, the second transmitter 360 of the first display module 410 may transmit backward control data including b_data #2 to the external input device.

In operation 665, the external input device may determine a setting value of the second display module 420 based on the illuminance sensor value b_data #2.

In operation 670, the external input device may transmit video data and control data to the first display module 410. In the illustrated example, the control data may include a setting value f_data #2 of the second display module.

In operation 675, the first display module 410 may perform backward control data formatting by the formatter 130 and video data and control data merging by the merger 140.

In operation 680, the first display module 410 may transmit the merged video data and control data to the second display module 420 by the transmitter 150.

In operation 685, the second display module 420 may set the second display module 420 based on f_data #2, which is control data used to control itself.

Figure 7:
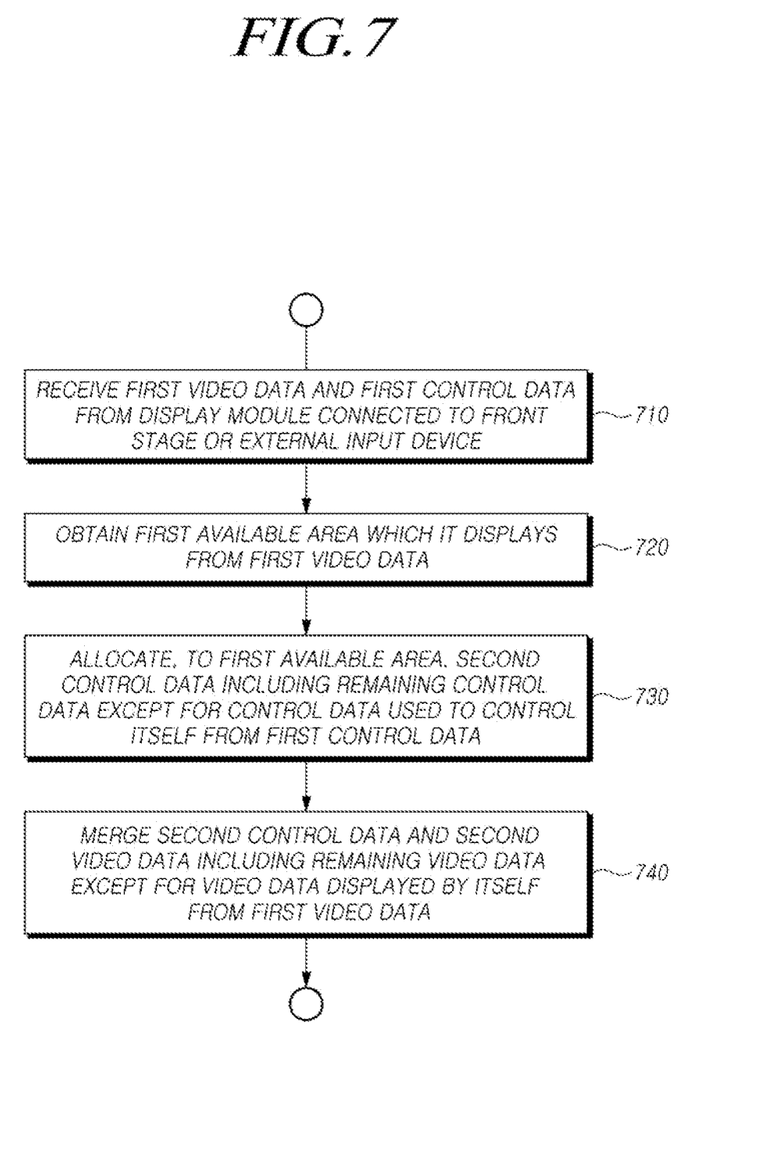
FIG. 7 is a flowchart schematically illustrating a data transmission method in a multi-display device according to an embodiment of the disclosure.

FIG. 7 is a flowchart schematically illustrating a data transmission method in a multi-display device according to an embodiment of the disclosure.

The multi-display device according to the embodiment may include a plurality of display modules sequentially connected.

According to an embodiment, referring to FIG. 7, in operation 710, first video data and first control data may be received from a display module connected to a front stage or an external input device by at least one display module of the multi-display device.

In operation 720, the at least one display module of the multi-display device may obtain, from the first video data, a first available area corresponding to video data that the display module (the at least one display module of the multi-display device) is configured to display.

In operation 730, the at least one display module of the multi-display device may allocate, to the first available area, second control data that excludes, from the first control data, control data to control the display module.

In operation 740, the at least one display module of the multi-display device may merge the second control data with second video data that excludes, from the first video data, the video data that the display module is configured to display.

Further, according to the embodiment, backward control data transmitted from a peripheral device connected to the display module to the external input device may be obtained by the at least one display module of the multi-display device. The backward control data may include control information for controlling a display module obtained from the peripheral device or include state information about a display module.

According to the embodiment, before merging the second video data and the second control data, a second available area corresponding to control data used to control the display module from the first control data may be obtained, and the backward control data may be formatted in the second available area by the at least one display module of the multi-display device. Accordingly, the second control data may further include the backward control data.

Further, according to the embodiment, the merged second video data and second control data may be transmitted to the display module connected to the rear stage by the at least one display module of the multi-display device. Transmitting the merged second video data and second control data to the display module connected to the rear stage may be performed by at least one communication chipset supporting a predetermined bandwidth, and wherein The number of the at least one communication chipset may be determined based on the predetermined bandwidth and a size of entire merged data of the second video data and the second control data.

Further, according to the embodiment, the backward control data obtained by at least one display module may be received from the rearmost display module by the foremost display module of the multi-display device.

Further, according to the embodiment, the backward control data received from the rearmost display module may be transmitted to the external input device by the foremost display module of the multi-display device.

The program executed by the multi-display device 400 and each display module 100 described herein may be a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be a computer program including instructions stored in computer-readable storage media. The computer-readable recording media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable recording media may be distributed to computer systems connected via a network, and computer-readable codes may be stored and executed in a distributed manner. The media may be read by a computer, stored in a memory, and executed by one or more processors.

The computer-readable storage medium may be provided in the form of a non-transitory storage medium. Here, the term "non-transitory" simply means that the storage medium does not include a signal and is tangible, but this term does not differentiate between where data is semi-permanently stored in the storage medium and where data is temporarily stored in the storage medium.

According to embodiments of the disclosure, the program may be included and provided in a computer program product. The computer program products may be traded as commodities between sellers and buyers. The computer program products may include software programs or computer-readable storage media storing the software programs. For example, the computer program products may include software program-type products (e.g., downloadable applications (apps)) that are electronically distributed through manufacturers of electronic devices or electronic markets (e.g., Google Play Store or App Store). For electronic distribution, at least part of the software programs may be stored in storage media or temporarily generated. In this case, the storage media may be storage media of relay servers that temporarily store the software programs, servers of electronic markets, or servers of manufacturers.

The computer program product may include a storage medium of a server or a storage medium of a device in a system including the server and the device. Alternatively, when there is a third device (e.g., a smart phone) that is communicatively connected to the server or device, the computer program product may include a storage medium of the third device. Alternatively, the computer program product may include the software program itself transmitted from the server to the device or the third device, or transmitted from the third device to the device. In this case, one of the server, the device, and the third device may execute the computer program product to perform the method according to the disclosed embodiments. Alternatively, two or more of the server, the device, and the third device may execute the computer program product to implement the method according to the disclosed embodiments. For example, the server may execute the computer program product stored in the server to control the device communicatively connected with the server to perform the method according to the disclosed embodiments. As another example, the third device may execute the computer program product to control the device communicatively connected to the third device to perform the method according to the disclosed embodiment. When the third device executes the computer program product, the third device may download the computer program product from the server and execute the downloaded computer program product. Alternatively, the third device may execute the computer program product provided in a pre-loaded state to perform the method according to the disclosed embodiments.

Although embodiments of the disclosure have been shown and described, it will be understood by one of ordinary skill in the art that various changes or modifications may be made without departing from the scope of the disclosure. For example, although the techniques described herein are performed in a different order from those described herein and/or the components of the above-described computer system or modules are coupled, combined, or assembled in a different form from those described herein, or some components are replaced with other components or equivalents thereof, a proper result may be achieved.

What is claimed is:

1. A multi-display device comprising:
a plurality of display modules that are sequentially connected,
wherein at least one display module of the plurality of display modules comprises:
a receiver configured to receive first video data and first control data from another display module connected to a front stage, from among the plurality of display modules, or an external input device, wherein a format of the first video data comprises a plurality of areas respectively storing a plurality of video data that the plurality of display modules are configured to respectively display, and the plurality of areas are stored in a memory;
one or more processors configured to obtain, from the first video data, a first area corresponding to video data that the at least one display module is configured to display; and
a merger configured to:
allocate, to the first area, second control data including remaining control data of the first control data other than control data of the first control data to control the at least one display module, and
merge the second control data with second video data including remaining video data of the first video data other than video data of the first video data that the at least one display module displays.

2. The multi-display device of claim 1, wherein the at least one display module further comprises:
an interface configured to obtain backward control data transmitted to the external input device from a peripheral device connected to the at least one display module,
a formatter configured to:
obtain, from the first control data, a second area corresponding to the control data to control the at least one display module, and
format the backward control data in the second area, and
wherein the second control data further includes the backward control data.

3. The multi-display device of claim 1, wherein the at least one display module further comprises a transmitter configured to transmit the merged second video data and second control data to another display module connected to a rear stage, from among the plurality of display modules.

4. The multi-display device of claim 3, wherein the transmitter comprises at least one communication chipset configured to support a predetermined bandwidth, and
wherein a number of the at least one communication chipset is determined based on the predetermined bandwidth and a size of the merged second video data and second control data.

5. The multi-display device of claim 2, wherein a first display module of the plurality of display modules further comprises a second receiver, and
wherein the second receiver is configured to receive, from a rearmost display module of the plurality of display modules, the backward control data obtained by at least one other display module.

6. The multi-display device of claim 5, wherein the first display module further comprises a second transmitter, and
wherein the second transmitter is configured to transmit the backward control data received by the second receiver to the external input device.

7. The multi-display device of claim 2, wherein the backward control data comprises control information for controlling the at least one display module or state information about the at least one display module.

8. A method for transmitting data in at least one display module of a plurality of sequentially connected display modules included in a multi-display device, the method comprising:
receiving first video data and first control data from another display module connected to a front stage, from among the plurality of sequentially connected display modules, or an external input device, wherein a format of the first video data comprises a plurality of areas respectively storing a plurality of video data that the plurality of display modules are configured to respectively display, and the plurality of areas are stored in a memory;
obtaining, from the first video data, a first area corresponding to video data that the at least one display module is configured to display;
allocating, to the first area, second control data including remaining control data of the first control data other than control data of the first control data to control the at least one display module; and
merging the second control data with second video data including remaining video data of the first video data other than video data of the first video data that the at least one display module displays from the first video data.

9. The method of claim 8, further comprising:
obtaining, from a peripheral device connected to the at least one display module, backward control data transmitted to the external input device from the peripheral device connected to the at least one display module; and
obtaining, from the first control data, a second area corresponding to the control data to control the at least one display module, and
formatting the backward control data in the second area, wherein the second control data further includes the backward control data.

10. The method of claim 8, further comprising transmitting the merged second video data and second control data to another display module connected to a rear stage, from among the plurality of sequentially connected display modules.

11. The method of claim 10, wherein the transmitting the merged second video data and second control data to the other display module connected to the rear stage is performed by at least one communication chipset supporting a predetermined bandwidth, and
wherein a number of the at least one communication chipset is determined based on the predetermined bandwidth and a size of the merged second video data and second control data.

12. The method of claim 9, further comprising receiving, from a rearmost display module by a foremost display module, the backward control data obtained by at least one other display module.

13. The method of claim 12, further comprising transmitting, by the foremost display module, the backward control data received from the rearmost display module to the external input device.

14. The method of claim 9, wherein the backward control data comprises control information for controlling the at least one display module obtained from the peripheral device or state information about the at least one display module.

* * * * *